United States Patent [19]
Ushirozawa

[11] Patent Number: 6,137,613
[45] Date of Patent: Oct. 24, 2000

[54] OPTICAL TRANSMISSION APPARATUS IN WHICH LIGHT SIGNAL WITH SELECTED WAVELENGTH IS MODULATED WITH SELECTED DATA SIGNAL

[75] Inventor: Mizuyuki Ushirozawa, Tokyo, Japan

[73] Assignee: NEC Corporation, Tokyo, Japan

[21] Appl. No.: 09/001,469

[22] Filed: Dec. 31, 1997

[30] Foreign Application Priority Data

Feb. 14, 1997 [JP] Japan .................................. 9-044856

[51] Int. Cl.[7] .................................................. H04B 10/04
[52] U.S. Cl. ........................ 359/181; 359/123; 359/128; 359/139; 359/187; 359/188
[58] Field of Search ................... 359/123, 128, 359/133, 139, 180, 181, 187, 188

[56] References Cited

U.S. PATENT DOCUMENTS

| | | | |
|---|---|---|---|
| 4,807,227 | 2/1989 | Fujiwara et al. | 370/3 |
| 4,933,929 | 6/1990 | Tajima | 370/3 |
| 5,062,559 | 11/1991 | Marcuse | 359/127 |
| 5,202,782 | 4/1993 | Nakamura et al. | 359/152 |
| 5,245,681 | 9/1993 | Guignard et al. | 385/16 |
| 5,394,261 | 2/1995 | Nakamura | 359/180 |
| 5,909,297 | 6/1999 | Ishikawa et al. | 359/161 |

FOREIGN PATENT DOCUMENTS

| | | |
|---|---|---|
| 63-299538 | 12/1988 | Japan . |
| 1-99336 | 4/1989 | Japan . |
| 1-114128 | 5/1989 | Japan . |
| 2-67525 | 3/1990 | Japan . |
| 2-219330 | 8/1990 | Japan . |
| 4-115732 | 4/1992 | Japan . |
| 8-251113 | 9/1996 | Japan . |

*Primary Examiner*—Huy D. Vu
*Assistant Examiner*—Vu Lieu
*Attorney, Agent, or Firm*—Young & Thompson

[57] ABSTRACT

In an optical transmitter, light outputs with different wavelengths are emitted from a plurality of light sources by a plurality of driving circuits, respectively. An optical switch control circuit controls an optical switch in response an input connection instruction such that an optional one of a plurality of input ports is connected to an optional one of a plurality of output ports to pass the light output from the optional input port to the optional output port. A plurality of modulator driving circuits drive a plurality of optical modulators in accordance with a plurality of data signals such that the light outputs from the output ports are optically modulated by the plurality of optical modulators, respectively.

20 Claims, 6 Drawing Sheets

OPTICAL TRANSMISSION APPARATUS IN WHICH LIGHT SIGNAL WITH SELECTED WAVELENGTH IS MODULATED WITH SELECTED DATA SIGNAL

BACKGROUND OF THE INVENTION

1. Field of the Invention

The present invention relates to an optical transmission apparatus. More particularly, the present invention relates to an optical transmission apparatus in which a selected one of light outputs with different wavelengths emitted from a plurality of light sources can be modulated with a selected one of a plurality of data signals.

2. Description of the Related Art

In the field of optical communication, various techniques are known. For example, in Japanese Laid Open Patent Disclosure (JP-A-Showa 63-299538), an optical switch circuit is disclosed. Also, in Japanese Laid Open Patent Disclosure (JP-A-Heisei 1-99336), an optical transmission apparatus is described in which replacement of an optical semiconductor element is made possible without stopping communication. In Japanese Laid Open Patent Disclosure (JP-A-Heisei 1-114128), a wavelength multiple optical communication system is disclosed in which a loop is provided in a light path in such a manner that detection of a fault part or a test can be easily performed. In Japanese Laid Open Patent Disclosure (JP-A-Heisei 2-67525), a transmitting method between an optical switch apparatus and an optical switch is described. In Japanese Laid Open Patent Disclosure (JP-A-Heisei 2-219330), a wavelength multiple light transmission system is described in which light outputs from the plurality of light sources are synthesized by an optical coupler of a plurality of stages.

Also, in Japanese Laid Open Patent Disclosure (JP-A-Heisei 4-115732), an optical transmission apparatus is described in which a range of dispersion degradation to be compensated can be expanded. In Japanese Laid Open Patent Disclosure (JP-A-Heisei 8-251113), an optical transmission apparatus is described in which the variation in phase between multiplexed light signals is devised to cancel sensitivity degradation.

However, in the above references, it is not described that an arbitrarily selected one of the light outputs from light sources can be modulated with an arbitrarily selected one of the data signals. Also, it is not described that the light intensity of the modulated signal can be set to a predetermined level at that time.

An optical transmission apparatus in which a combination of one of a plurality of light signals and a single data signal can be optionally set is described in U.S. Pat. No. 5,245,681 (a first conventional example). In this conventional example, one optionally selected light signal from among light outputs with different wavelengths respectively emitted from a plurality of light sources is modulated with a single data signal by a single optical modulator to produce a light signal.

Figure 1:
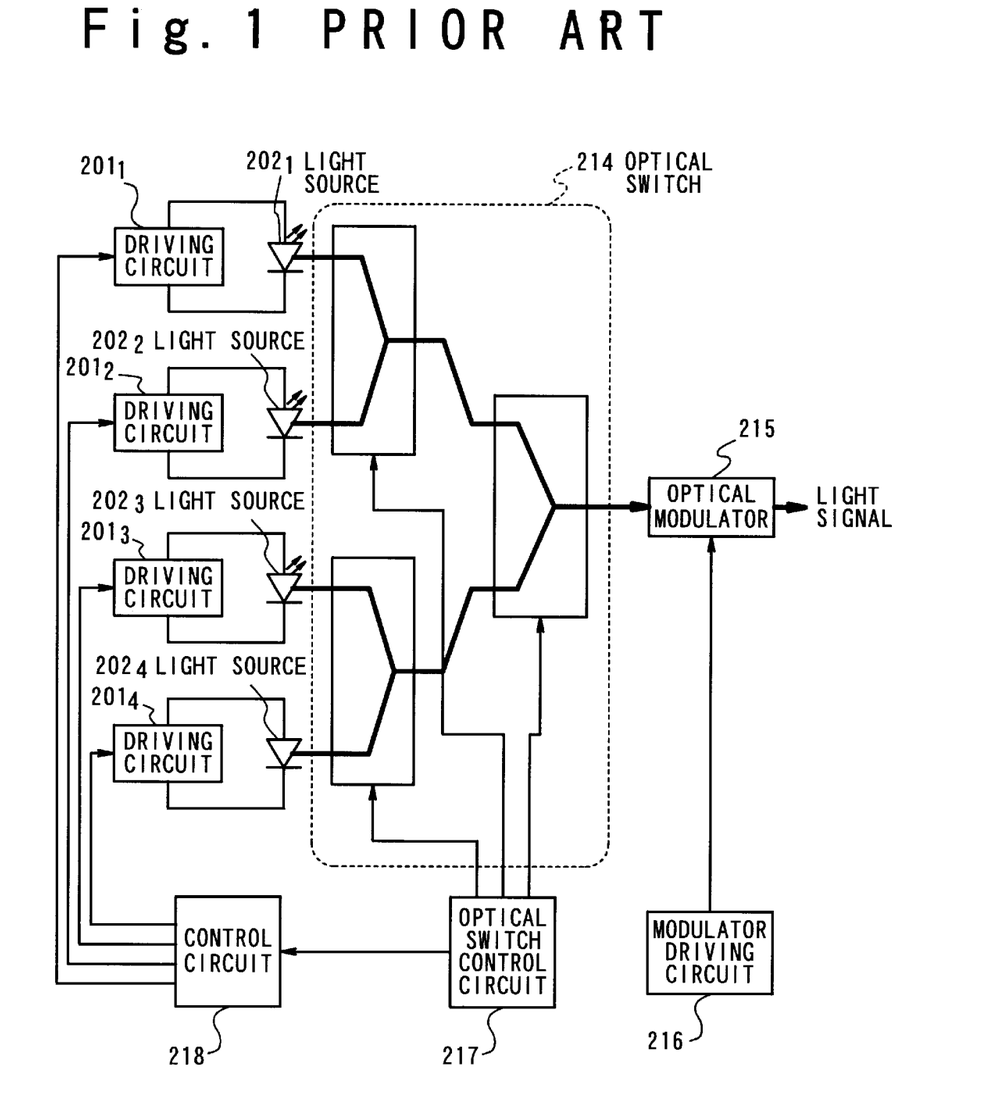
FIG. 1 is a block diagram illustrating the structure of a first conventional example of an optical transmission apparatus.

FIG. 1 is a block diagram illustrating the structure of the first conventional example of optical transmission apparatus. In the first conventional example of optical transmission apparatus, 4 light sources are used.

Referring to FIG. 1, continuous wave (CW) light outputs with different wavelengths are outputted from first to fourth light sources $202_1$ to $202_4$. The light outputs from the first to fourth light sources $202_1$ to $202_4$ are supplied to the input ports of an optical switch 214. The optical switch 214 is a (4×1) optical switch which is composed of 2-stage (2×1) optical switches. The optical switch 214 outputs one selected from among the light outputs from the four light sources $202_1$ to $202_4$ in accordance with control signals from an optical switch control circuit 217. The selected light output is modulated in accordance with a data signal from a modulator driving circuit 216 in the optical modulator 215 and is outputted onto an optical fiber or a transmission path as a light signal.

The optical switch control circuit 217 controls a control circuit 218 in addition to the optical switch 214. The control circuit 218 controls the first to fourth driving circuit $201_1$ to $201_4$ such that each of the light outputs from the first to fourth light sources $202_1$ to $202_4$ has a predetermined optical power level.

When the first conventional example of the optical transmission apparatus is applied to the wavelength division light transmission apparatus for N wavelengths, there is the following problem. That is, in the first conventional example of the optical transmission apparatus shown in FIG. 1, if it is required that an arbitrary combination of one of the N light outputs emitted from the N light sources and one of the N data signals can be selected, then N of the same optical system units are needed. That is, (N×N) light sources, N modulators and N optical switches are needed. Accordance, the apparatus structure becomes very complicated and becomes expensive.

Figure 2:
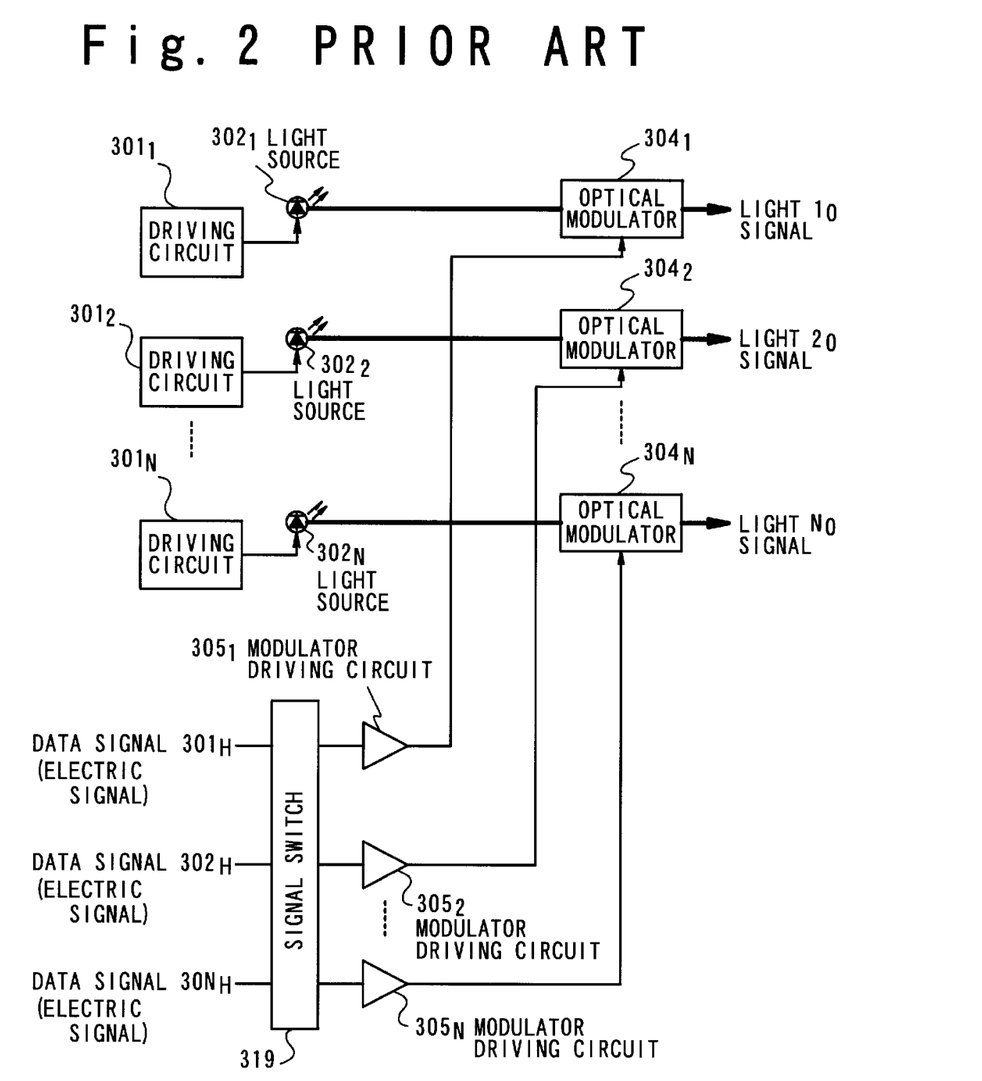
FIG. 2 is a block diagram illustrating the structure of a second conventional example of the optical transmission apparatus.

FIG. 2 is a block diagram illustrating the structure of a second conventional example of an optical transmission apparatus using typical optical modulators. In the second conventional example of the optical transmission apparatus, one of light outputs with different wavelengths emitted from N (N is an integer equal to or more than 2) light sources is modulated with one selected from among data signals through electrical switching into a light signal by optical modulators, respectively.

The light outputs with the different wavelengths emitted from the first to N-th light sources $302_1$ to $302_N$ are inputted to first to N-th optical modulators $304_1$ to $304_N$ and are modulated based on N data signals $301_H$ to $30N_H$. As a result, N light signals $1_O$ to $N_O$ are outputted from the first to N-th optical modulators $304_1$ to $304_N$, respectively. To select a combination of the light output emitted from each light source and one of the electric data signals as modulation signals, a (4×4) electric signal switching unit 319 needs to be provided between the data signals and the modulator driving circuits $305_1$ to $305_N$.

However, in the second conventional example of the optical transmission apparatus shown in FIG. 2, because only N light sources and N modulators are needed, the structure of the optical system can be simplified. However, the data signal inputted to the optical modulator must be switched by the electric signal switching unit 319 when the modulation is performed in the combination of a light output from a light source with a wavelength and the data signal. In this case, when the transmission rate of the data signal is high, the switching between the data signals becomes difficult.

SUMMARY OF THE INVENTION

The present invention is accomplished to solve the above problems. Therefore, an object of the present invention is to provide an optical transmission method and an optical transmission apparatus, which can be applied to a wavelength divisional multiple transmission apparatus for N light sources having different wavelengths, which has small circuit scale, and in which the combination of one of light outputs with different wavelengths and one of data signals for modulating the light output can be easily switched.

In order to achieve an aspect of the present invention, an optical transmitter includes a plurality of light sources for emitting light outputs with different wavelengths, respectively, a plurality of driving circuits for driving the plurality of light sources, respectively, an optical switch having a plurality of input ports respectively connected to the plurality of light sources and a plurality of output ports, an optical switch control circuit for controlling the optical switch in response to an input connection instruction such that an optional one of the plurality of input ports is connected to an optional one of the plurality of output ports to pass the light output at the optional input port to the optional output port, a plurality of optical modulators connected to the plurality of output ports, for modulating the light outputs from the output ports to output light signals, respectively, and a plurality of modulator driving circuits provided for the plurality of optical modulators, for driving the plurality of optical modulators in accordance with a plurality of data signals such that the light outputs from the output ports are optically modulated by the plurality of optical modulators, respectively.

The optical transmitter may further include an optical coupler for coupling the plurality of light signals into a new light signal.

The optical switch control circuit controls each of the plurality of driving circuits such that the light output from the light source corresponding to the driving circuit has a predetermined light intensity. In this case, the optical transmitter may further include an optical coupler for coupling the plurality of light signals into a new light signal.

The optical switch control circuit controls each of the plurality of driving circuits such that the light signal from the optical modulator which is operatively connected to the light source corresponding to the driving circuit has a predetermined light intensity. In this case, the optical transmitter may further include an optical coupler for coupling the plurality of light signals into a new light signal.

The optical switch control circuit may include a table for storing compensation quantities for passage losses of connection paths between the plurality of input ports and the plurality of output ports, and refers to the table based on the connection path for one of the plurality of light sources corresponding to each of the plurality of driving circuits the driving circuit to control the driving circuits based on the referred compensation quantity. In this case, the optical transmitter may further include an optical coupler for coupling the plurality of light signals into a new light signal.

The optical switch control circuit may include a table for storing a compensation quantity for passage losses for connection paths between the plurality of input ports and the plurality of output ports and losses of the plurality of optical modulators corresponding to the plurality of output ports, and refers to the table based on the connection path for one of the plurality of light sources corresponding to each of the plurality of driving circuits to control the driving circuits based on the referred compensation quantity. In this case, the optical transmitter may further include an optical coupler for coupling the plurality of light signals into a new light signal.

The optical transmitter may further include a plurality of optical branchers provided for the plurality of optical modulators, for branching parts of the light signals from the plurality of optical modulators, respectively, and a plurality of optical detectors provided for the plurality of optical branchers, for detecting power outputs of the branched parts of the plurality of light signals to supply to the optical switch control circuit. In this case, the optical switch control circuit controls the plurality of driving circuits based on the detected power outputs from the plurality of optical detectors, such that the power outputs from the plurality of optical modulators has predetermined power output levels, respectively. The optical transmitter may further include an optical coupler for coupling the plurality of light signals into a new light signal.

In order to achieve another aspect of the present invention, a method of transmitting an electric signal in a form of optical signal, includes the steps of:

emitting a light output with a wavelength;

connecting the light output to one of a plurality of optical modulators through one of a plurality of connection paths in response to a connection instruction;

optically modulating the light output in the optical modulator based on an electric signal to output a light signal from the optical modulator.

DESCRIPTION OF THE PREFERRED EMBODIMENTS

Next, the optical transmission apparatus of the present invention will be described in detail with reference to the accompanying drawings.

Figure 3:
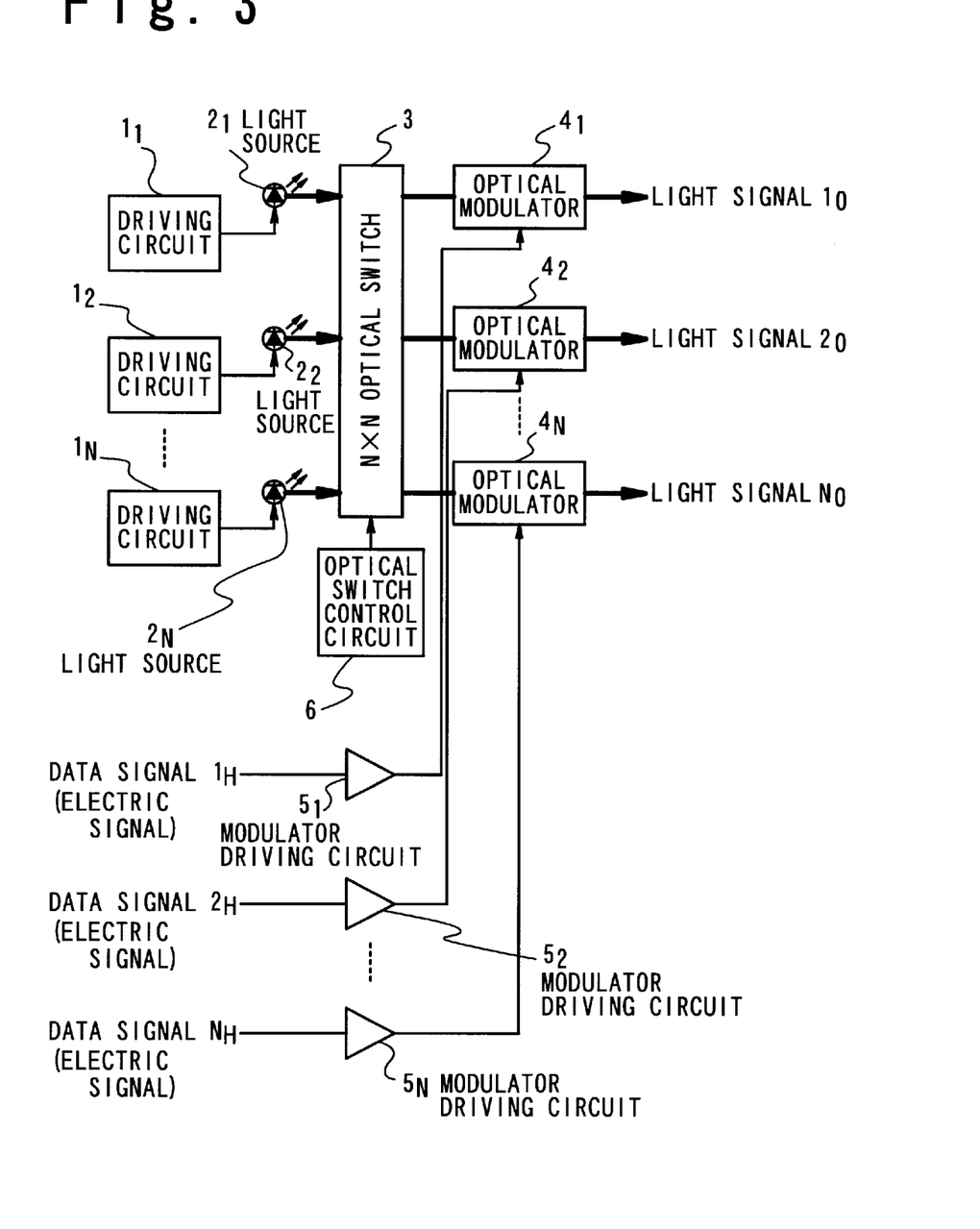
FIG. 3 is a block diagram illustrating the structure of the optical transmission apparatus according to the first embodiment of the present invention.

First, the optical transmission apparatus according to the first embodiment of the present invention will be described. FIG. 3 is a block diagram illustrating the structure of the optical transmission apparatus in the first embodiment.

Referring to FIG. 3, the optical transmission apparatus in this embodiment is composed of N (N is an integer equal to or more than 2) driving circuits $1_1$ to $1_N$, and N light sources $2_1$ to $2_N$ driven by the driving circuit $1_1$ to $1_N$ to output CW light outputs with different wavelengths, respectively. The optical transmission apparatus is also composed of N optical modulators $4_1$ to $4_N$, N modulator driving circuits $5_1$ to $5_N$ which are fixedly connected to the optical modulators $4_1$ to $4_N$, for driving the optical modulators $4_1$ to $4_N$ based on data signals inputted thereto, respectively, an (N×N) optical switch 3 having N input ports respectively connected to the light sources $2_1$ to $2_N$ and N output ports respectively connected to the optical modulators $4_1$ to $4_N$. The optical transmission apparatus is further composed of an optical switch control circuit 6 for controlling the switching between connection paths between the input ports and the output ports in the optical switch 3.

In the optical transmission apparatus in the first embodiment, the CW light outputs with different wavelengths emitted from the light sources $2_1$ to $2_N$ are respectively controlled by the driving circuits $1_1$ to $1_N$ such that the output power of each of the light outputs has a predetermined level. The light outputs from the light sources $2_1$ to $2_N$ are supplied to the input ports of the optical switch 3. The optical switch 3 outputs each of the light outputs from the light sources $2_1$ to $2_N$ to one of the output ports in accordance with the control of the optical switch control circuit 6. The light outputs from the respective output ports of the optical switch 3 are modulated based on the electric data signals supplied from the modulator driving circuits $5_1$ to $5_N$ in the optical modulators 41 to $4_N$. The modulated light outputs are sent out to optical transmission paths or optical fibers as light signal $1_O$ to $N_O$, respectively.

In accordance with the first embodiment, the connection state between the input ports and the output ports in the optical switch 3 can be switched by the optical switch control circuit 6. Thus, each of the light outputs from the light sources $2_1$ to $2_N$ can be outputted to an optionally switched one of the optical modulators $4_1$ to $4_N$ and is modulated based on one of the data signals $1_H$ to $N_H$ corresponding to the switched optical modulator. Also, by adopting such a structure, because it is not necessary to switch the data signal, the structure of the optical transmission apparatus can be simplified, even if the optical signal has a high transmission rate.

Figure 4:
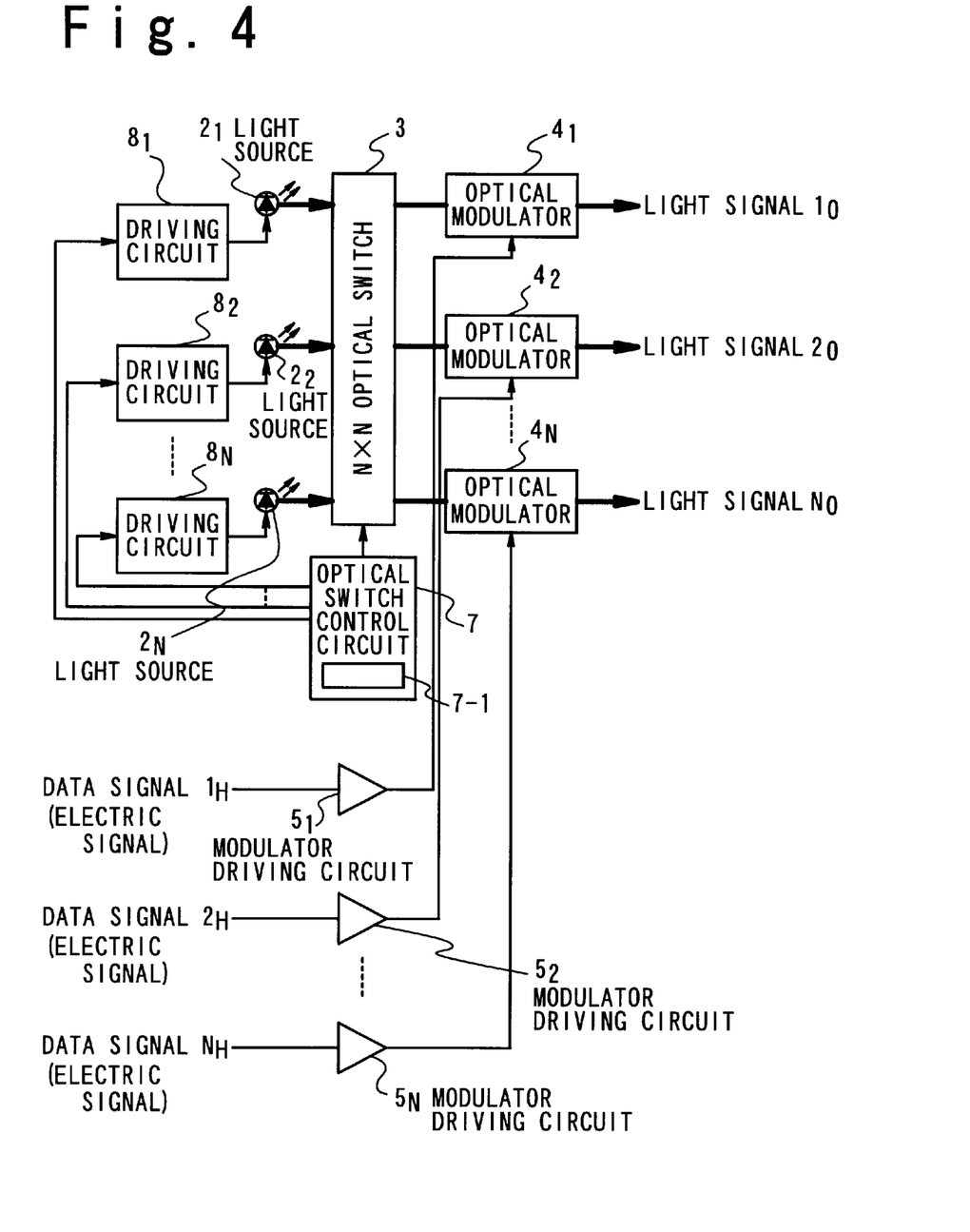
FIG. 4 is a block diagram illustrating the structure of the optical transmission apparatus according to the second embodiment of the present invention.

Next, the optical transmission apparatus according to the second embodiment of the present invention will be described. FIG. 4 is a block diagram illustrating the structure of the optical transmission apparatus in the second embodiment.

Referring to FIG. 4, the structure of the optical transmission apparatus in the second embodiment is basically the same as that of the optical transmission apparatus in the first embodiment shown in FIG. 3. The different point is in that driving circuits $8_1$ to $8_N$ are controlled by the optical switch control circuit 7 in place of the driving circuits $1_1$ to $1_N$ and the optical switch control circuit 7. Another different point is in that the optical switch control circuit 7 has a table 7-1 for storing compensation quantities.

In the optical switch 3, a passage loss for a light output from a light source generally changes when the connection path for the light output is switched between combinations of the input ports and the output ports. In other words, the power levels of the light signals $1_O$ to $N_O$ outputted from the optical modulators $4_1$ to $4_N$ change on the switching of the connection paths in the optical switch 3. Therefore, in the optical transmission apparatus in the second embodiment, the change of power level in each of the light signals $1_O$ to $N_O$ outputted from the modulators is restrained on the switching of the connection state in the optical switch 3. Also, the power levels of the light signals $1_O$ to $N_O$ are always controlled to be at predetermined levels, respectively.

The optical switch control circuit 7 compensates the change of the passage loss in the optical switch 3 by controlling the driving circuits $8_1$ to $8_N$ in addition to the connection paths between the input ports and output ports in the optical switch 3. Thus, the optical switch control circuit 7 controls the driving circuits $8_1$ to $8_N$ to drive the light sources $2_1$ to $2_N$.

The passage loss quantity is previously measured for every connection path and for every wavelength and a compensation quantity for the passage loss quantity is stored in the table 7-1 for every connection path and for every wavelength. In operation, when the connection state in the optical switch 3 is switched, a control signal containing the compensation quantity of the passage loss is supplied from the optical switch control circuit 7 to at least one of the driving circuits $8_1$ to $8_N$. In this way, the output power of each of the light outputs of the light sources $2_1$ to $2_N$ is controlled.

As shown in FIG. 4, the output power from each of the output ports of the optical switch 3 can be set to a predetermined level. Also, if the loss in each of the optical modulators $4_1$ to $4_N$ is considered for the compensation, the output power level of each of the light signals $1_O$ to $N_O$ can be set to a predetermined level regardless of the switching of the connection state in the optical switch 3.

Figure 5:
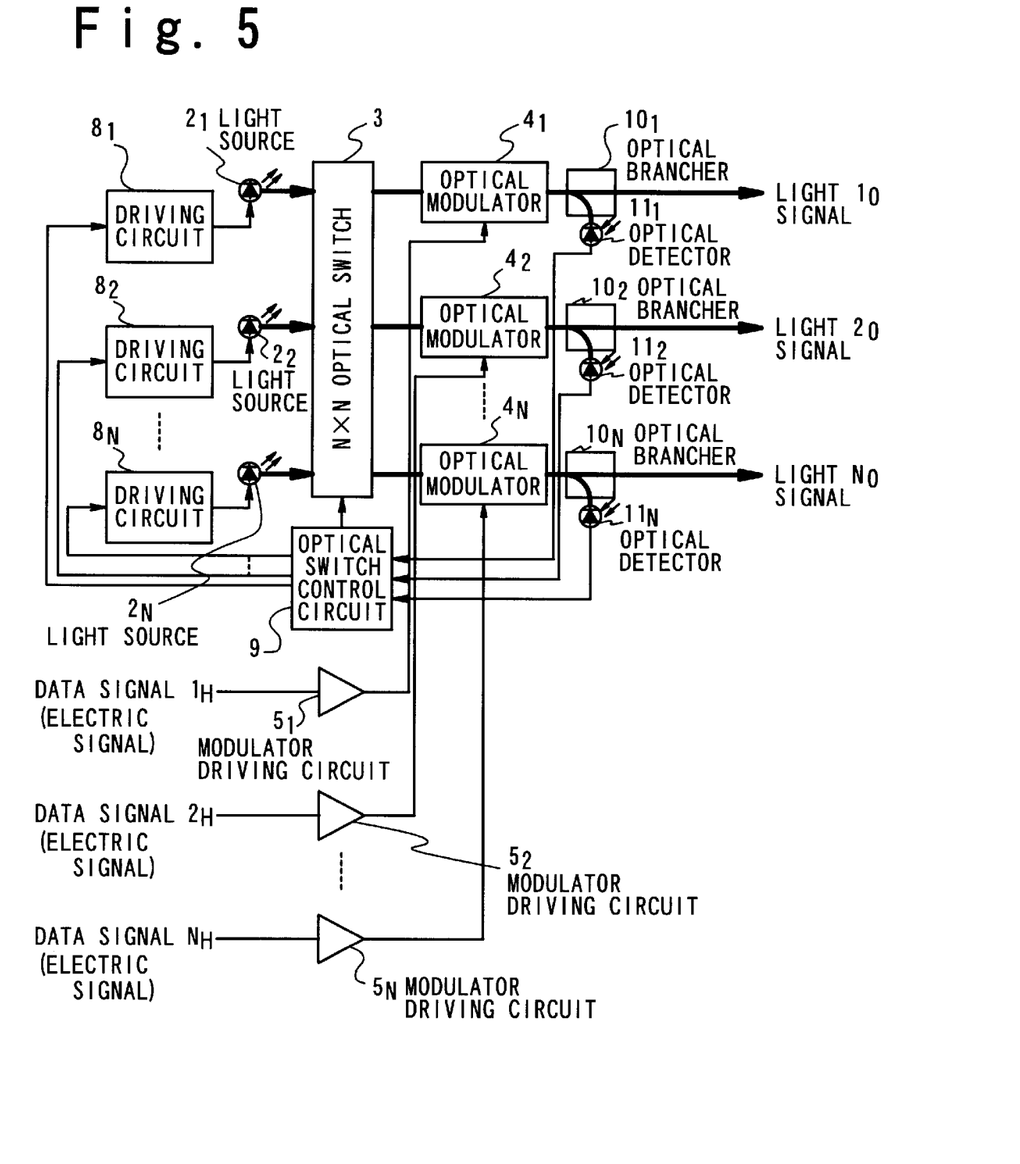
FIG. 5 is a block diagram illustrating the structure of the optical transmission apparatus according to the third embodiment of the present invention.

FIG. 5 is a block diagram illustrating the structure of the optical transmission apparatus according to the third embodiment of the present invention. In the third embodiment, the output power of each light signal from the optical modulators $4_1$ to $4_N$ is set to a predetermined value.

An optical transmission apparatus is composed of light branching units $10_1$ to $10_N$ to branch the light signal in two parts and light detectors $11_1$ to $11_N$ in addition to the structure of the optical transmission apparatus shown in FIG. 4. Also, the optical switch control circuit 7 is replaced by an optical switch control circuit 9. The light branching units $10_1$ to $10_N$ are connected to the outputs of the optical modulators $4_1$ to $4_N$, respectively. One branched light signal parts from each of the light branch units $10_1$ to $10_N$ is supplied to a corresponding one of the light detectors $11_1$ to $11_N$. Each of the light detectors $11_1$ to $11_N$ generates an electric signal which is proportional to the output power of the light signal from the corresponding one of the optical modulators $4_1$ to $4_N$ and supplies to the optical switch control circuit 9. The optical switch control circuit 9 feeds back the electric signals from the light detectors $11_1$ to $11_N$ to the driving circuits $8_1$ to $8_N$ based on the connection state of the (N×N) optical switch 3 to perform feed-back control, respectively. Thus, even when the connection state of the (N×N) optical switch 3 is switched, the power of the light signal from each of the optical modulators $4_1$ to $4_N$ can be always maintained by the predetermined value.

Figure 6:
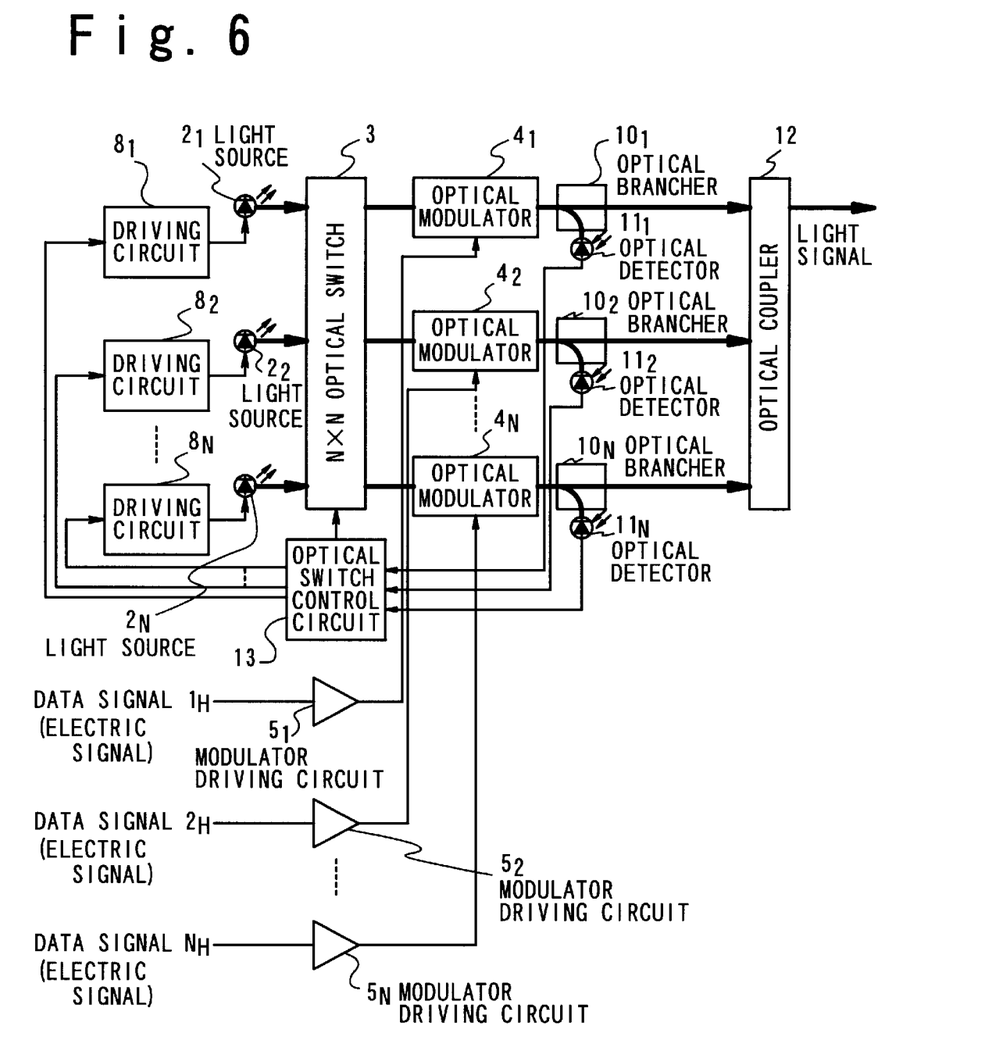
FIG. 6 is a block diagram illustrating to the structure of a modification of the optical transmission apparatus according to the third embodiment of the present invention.

FIG. 6 is a block diagram illustrating a modification of the third embodiment of the present invention. The optical transmission apparatus of this embodiment is an optical transmission apparatus which is suitable to apply to the wavelength division multiple transmission apparatus. As shown in FIG. 6, in the multiple wavelength division transmission apparatus, the light signals from the optical branching units $10_1$ to $10_N$ via the N optical modulators $4_1$ to $4_N$ are synthesized by an optical coupler 12 and is outputted onto a single optical fiber. The optical coupler 12 which synthesizes the light signals has a different passage loss value for every input port of the optical coupler 12.

In this example, the passage loss value of optical coupler 12 is previously measured for every input port. The optical switch control circuit 13 stores a control quantity for compensating the driving circuit for the passage loss value for all the input ports of the optical coupler 12. Also, the optical switch control circuit 13 operates in such a manner that the control quantity for the compensation of the passage loss value is added to the feedback control quantity which is generated based on the electric signal from a corresponding one of the light detectors $11_1$ to $11_N$. Then, the addition result is supplied to the corresponding one of the driving circuits $8_1$ to $8_N$. In this manner, even if the (N×N) optical switch 3 is switched, the power of each of the light signals with respective wavelengths which are contained in the light output after the synthesis by the optical coupler 12 can be always set to a predetermined value.

As described above, according to the optical transmission apparatus of the present invention, the (N×N) optical switch is provided between the light sources which output the light outputs to be modulated and the optical modulators to which the electric data signals are inputted from the modulator driving circuits. Therefore, the combination of one of the light outputs with wavelengths and one of the electric data signals which are used to modulate the light outputs can be easily changed.

Also, the optical transmission apparatus can be realized in the small circuit scale. Also, the control quantity to compensate the driving circuit for the optical switch passage loss is fed back to control the light output from the light source. Therefore, it is possible to always maintain the optical modulator output power to a desired value based on the switching state in the (N×N) optical switch. In accordance with, the optical transmission apparatus of the present invention is suitable for the wavelength multiple transmission apparatus.

What is claimed is:

1. An optical transmitter comprising:
   a plurality of light sources for emitting light outputs with different wavelengths, respectively;
   a plurality of driving circuits for driving said plurality of light sources, respectively;
   an optical switch having a plurality of input ports respectively connected to said plurality of light sources and a plurality of output ports;
   an optical switch control circuit for controlling said optical switch in response an input connection instruction such that an optional one of said plurality of input ports is connected to an optional one of said plurality of output ports to pass said light output at said optional input port to said optional output port;
   a plurality of optical modulators connected to said plurality of output ports, for modulating said light outputs from said output ports to output light signals, respectively; and
   a plurality of modulator driving circuits provided for said plurality of optical modulators, for driving said plurality of optical modulators in accordance with a plurality of data signals such that said light outputs from said output ports are optically modulated by said plurality of optical modulators, respectively.

2. An optical transmitter according to claim 1, further comprising an optical coupler for coupling said plurality of light signals into a new light signal.

3. An optical transmitter according to claim 1, wherein said optical switch control circuit controls each of said plurality of driving circuits such that said light output from said light source corresponding to said driving circuit has a predetermined light intensity.

4. An optical transmitter according to claim 3, further comprising an optical coupler for coupling said plurality of light signals into a new light signal.

5. An optical transmitter according to claim 1, wherein said optical switch control circuit controls each of said plurality of driving circuits such that said light signal from said optical modulator which is operatively connected to said light source corresponding to said driving circuit has a predetermined maximum light intensity.

6. An optical transmitter according to claim 5, further comprising an optical coupler for coupling said plurality of light signals into a new light signal.

7. An optical transmitter according to claim 1, wherein said optical switch control circuit includes a table for storing compensation quantities for passage losses of connection paths between said plurality of input ports and said plurality of output ports, and refers to said table based on said connection path for one of said plurality of light sources corresponding to each of said plurality of driving circuits said driving circuit to control said driving circuits based on the referred compensation quantity.

8. An optical transmitter according to claim 7, further comprising an optical coupler for coupling said plurality of light signals into a new light signal.

9. An optical transmitter according to claim 1, wherein said optical switch control circuit includes a table for storing a compensation quantity for passage losses for connection paths between said plurality of input ports and said plurality of output ports and losses of said plurality of optical modulators corresponding to said plurality of output ports, and refers to said table based on said connection path for one of said plurality of light sources corresponding to each of said plurality of driving circuits said driving circuit to control said driving circuits based on the referred compensation quantity.

10. An optical transmitter according to claim 9, further comprising an optical coupler for coupling said plurality of light signals into a new light signal.

11. An optical transmitter according to claim 1, further comprising:
    a plurality of optical branchers provided for said plurality of optical modulators, for branching parts of said light signals from said plurality of optical modulators, respectively; and
    a plurality of optical detectors provided for said plurality of optical branchers, for detecting power outputs of said branched parts of said plurality of light signals to supply to said optical switch control circuit, and
    wherein said optical switch control circuit controls said plurality of driving circuits based on the detected power outputs from said plurality of optical detectors, such that said power outputs from said plurality of optical modulators has predetermined power output levels, respectively.

12. An optical transmitter according to claim 11, further comprising an optical coupler for coupling said plurality of light signals into a new light signal.

13. A method of transmitting an electric signal in a form of optical signal, comprising the steps of:
    emitting a plurality of light outputs having different wavelengths;
    connecting an optional one of the plurality of light outputs to an optional one of a plurality of optical modulators through an optical switch using one of a plurality of connection paths in response to a connection instruction;
    optically modulating the optional one of the plurality of light outputs in the optional one of the plurality of optical modulators based on an electric signal so as to output a modulated light signal.

14. A method according to claim 13, further comprising the step of coupling a plurality of modulated light signals from the plurality of optical modulators into a new light signal.

15. A method according to claim 13, further comprising the step of controlling the emission of the optional one of the plurality of light outputs such that the modulated light signal has a predetermined power output level.

16. A method according to claim 15, wherein said controlling step further comprises:

branching a part of the modulated light signal;

detecting a power output of the branched part of the modulated light signal; and performing feedback control for controlling the emission of the optional one of the plurality of light outputs.

17. A method according to claim 15, wherein said controlling step comprises referring to a table based on the connection path to control the emission of the light output based on at least one compensation quantity, wherein the table stores compensation quantities for each of the plurality of connection paths.

18. A method according to claim 17, wherein the table further stores compensation quantities for losses of each of the plurality of optical modulators.

19. A method of transmitting an electric signal in a form of optical signal, comprising the steps of:

emitting a light output having a wavelength;

connecting the light output to one of a plurality of optical modulators through one of a plurality of connection paths in response to a connection instruction;

optically modulating the light output in the optical modulator based on an electric signal to output a light signal from the optical modulator; and controlling the emission of the light output such that the light signal has a predetermined power output level, wherein said controlling step includes referring to a table based on the connection path to control the emission of the light output based on a compensation quantity, and wherein the table stores compensation quantities for the plurality of connection paths.

20. A method according to claim 19, wherein the table further stores compensation quantities for losses of the plurality of optical modulators.

* * * * *